US012632095B2

(12) United States Patent
Alton et al.

(10) Patent No.: US 12,632,095 B2
(45) Date of Patent: May 19, 2026

(54) POWER CONTROL OF COMPUTING DEVICES

(71) Applicant: QUALCOMM Incorporated, San Diego, CA (US)

(72) Inventors: Ronald Alton, Oceanside, CA (US); Louis Louie, San Diego, CA (US); Chandan Agarwalla, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 18/507,955

(22) Filed: Nov. 13, 2023

(65) Prior Publication Data

US 2024/0281044 A1 Aug. 22, 2024

Related U.S. Application Data

(60) Provisional application No. 63/447,572, filed on Feb. 22, 2023.

(51) Int. Cl.
*G06F 1/00* (2006.01)
*G06F 1/26* (2006.01)

(52) U.S. Cl.
CPC ..................................... *G06F 1/26* (2013.01)

(58) Field of Classification Search
CPC ........ G06F 1/26; G06F 1/3206; G06F 1/3212; G06F 1/324; G06F 1/3296; Y02D 10/00
See application file for complete search history.

(56) References Cited

U.S. PATENT DOCUMENTS

| | | | | |
|---|---|---|---|---|
| 10,732,683 | B2 * | 8/2020 | Bedare | ...................... G06F 1/26 |
| 11,281,279 | B2 * | 3/2022 | Sodhi | .................... G06F 1/3206 |
| 11,822,418 | B2 * | 11/2023 | Messick | .............. G06F 11/3062 |
| 2009/0177422 | A1 * | 7/2009 | Cox | ...................... G06F 1/3203 |
| | | | | 702/186 |
| 2009/0276651 | A1 * | 11/2009 | Conroy | .................. G06F 1/324 |
| | | | | 713/340 |

(Continued)

FOREIGN PATENT DOCUMENTS

WO 2022250673 A1 12/2022

OTHER PUBLICATIONS

International Search Report and Written Opinion—PCT/US2024/010924—ISA/EPO—Apr. 24, 2024.

*Primary Examiner* — Xuxing Chen
(74) *Attorney, Agent, or Firm* — Seyfarth Shaw LLP

(57) ABSTRACT

A method for power control includes receiving first power consumption data of a first compute device based on measurements of the first compute device, and receiving second power consumption data of a second compute device based on measurements of the second compute device. The method further includes receiving system power data to obtain a system power limitation. The method also includes calculating a power budget threshold for the first compute device and the second compute device based on the first power consumption data, the second power consumption data, and the system power limitation. The method includes controlling performance of the first compute device to operate within the power budget threshold, and controlling performance of the second compute device to operate within the power budget threshold.

20 Claims, 6 Drawing Sheets

(56)  References Cited

U.S. PATENT DOCUMENTS

| | | | |
|---|---|---|---|
| 2011/0055596 A1* | 3/2011 | Wyatt | G06F 1/3203 |
| | | | 345/212 |
| 2013/0332753 A1* | 12/2013 | Varma | G06F 1/3287 |
| | | | 713/300 |
| 2014/0082378 A1* | 3/2014 | Schluessler | G06F 1/26 |
| | | | 713/300 |
| 2015/0006925 A1* | 1/2015 | Branover | G06F 1/206 |
| | | | 713/320 |
| 2015/0177814 A1* | 6/2015 | Bailey | G06F 1/3296 |
| | | | 713/320 |
| 2015/0309551 A1 | 10/2015 | Yeager | |
| 2017/0160783 A1* | 6/2017 | Kawabe | G06F 1/324 |
| 2018/0314308 A1* | 11/2018 | Savidis | G06F 9/4893 |
| 2020/0064894 A1* | 2/2020 | Li | G06F 1/26 |
| 2021/0181830 A1* | 6/2021 | Lee | G06F 1/3296 |
| 2021/0405728 A1* | 12/2021 | Jain | H05K 7/1487 |
| 2022/0283628 A1* | 9/2022 | Montero | G06F 1/3296 |
| 2024/0385674 A1* | 11/2024 | Lin | G06F 1/3265 |

* cited by examiner

100

| | |
|---|---|
| 102 — CPU | MULTIMEDIA — 112 |
| 104 — GPU | |
| 106 — DSP | SENSORS — 114 |
| 108 — NPU | ISPs — 116 |
| 110 — CONNECTIVITY | MEMORY — 118 |
| | NAVIGATION — 120 |

300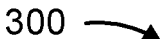

Thread #1

Init periodic budget thread
s302

Wait for signal or timer
s304 s306 — Timer or Comms

Timer expired s310 — Read PWR data for CPU and GPU

Read system power data — s312 s314 — Run PID algos

Select min power limit — s316

Generate CPU and GPU budgets — s318

Send new budgets to CPU and GPU — s320 sleep

Thread #2

Init communications
s340

Wake Signal

Handle comms interrupts
s342

Comms received

Update power limits — s308

Power limits — 226

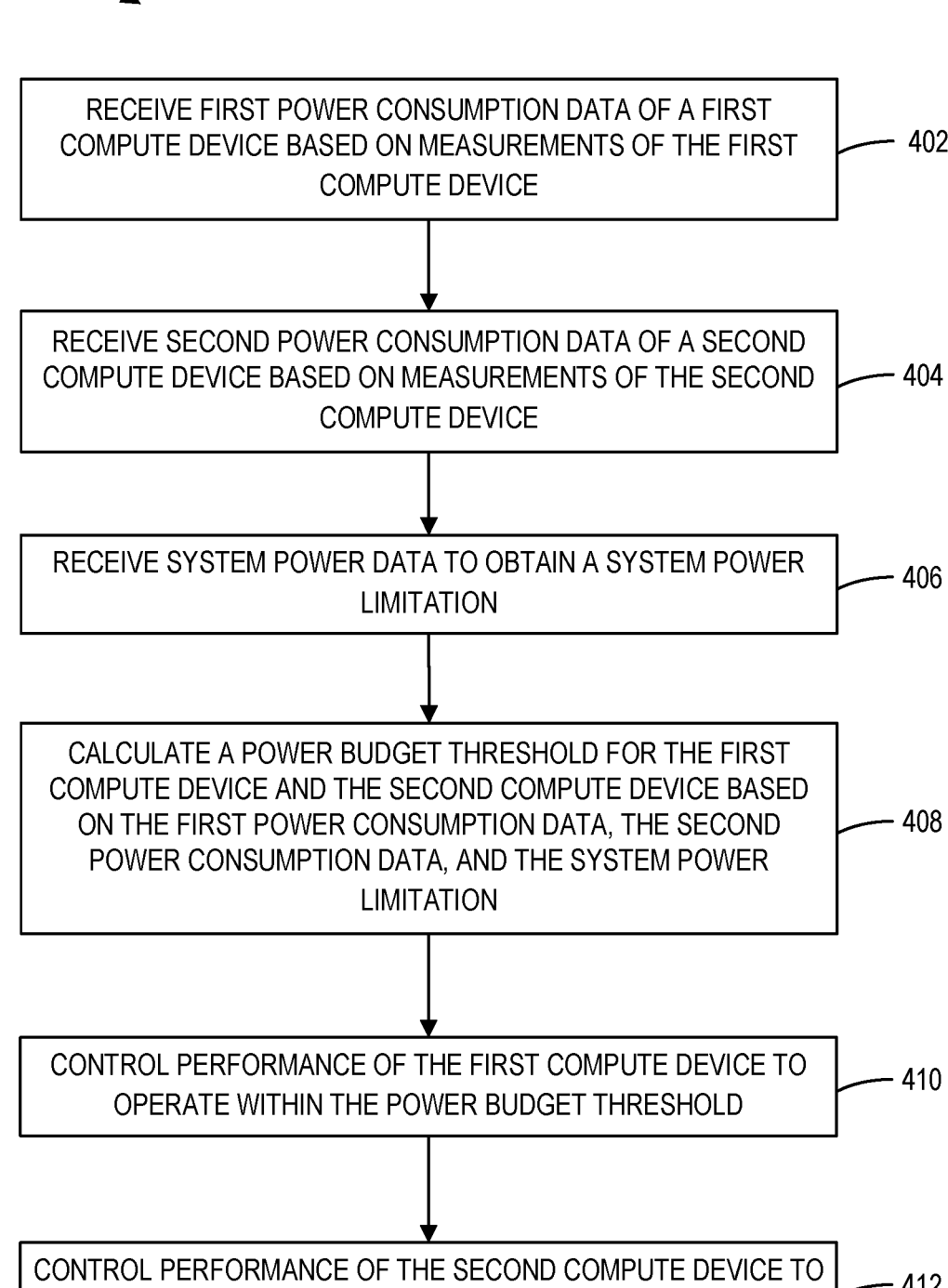

RECEIVE FIRST POWER CONSUMPTION DATA OF A FIRST COMPUTE DEVICE BASED ON MEASUREMENTS OF THE FIRST COMPUTE DEVICE ── 402

RECEIVE SECOND POWER CONSUMPTION DATA OF A SECOND COMPUTE DEVICE BASED ON MEASUREMENTS OF THE SECOND COMPUTE DEVICE ── 404

RECEIVE SYSTEM POWER DATA TO OBTAIN A SYSTEM POWER LIMITATION ── 406

CALCULATE A POWER BUDGET THRESHOLD FOR THE FIRST COMPUTE DEVICE AND THE SECOND COMPUTE DEVICE BASED ON THE FIRST POWER CONSUMPTION DATA, THE SECOND POWER CONSUMPTION DATA, AND THE SYSTEM POWER LIMITATION ── 408

CONTROL PERFORMANCE OF THE FIRST COMPUTE DEVICE TO OPERATE WITHIN THE POWER BUDGET THRESHOLD ── 410

CONTROL PERFORMANCE OF THE SECOND COMPUTE DEVICE TO OPERATE WITHIN THE POWER BUDGET THRESHOLD ── 412

POWER CONTROL OF COMPUTING DEVICES

CROSS-REFERENCE TO RELATED APPLICATION

The present application claims the benefit of U.S. Provisional Patent Application No. 63/447,572, filed on Feb. 22, 2023, and titled "POWER CONTROL OF COMPUTING DEVICES," the disclosure of which is expressly incorporated by reference in its entirety.

BACKGROUND

Field

Aspects of the present disclosure relate to computing devices, and more specifically to power control of computing devices based on system level power measurements.

Background

Mobile or portable computing devices include mobile phones, laptop, palmtop and tablet computers, portable digital assistants (PDAs), portable game consoles, and other portable electronic devices. Mobile computing devices are comprised of many electrical components that consume power and generate heat. The components (or compute devices) may include system-on-a-chip (SoC) devices, graphics processing unit (GPU) devices, neural processing unit (NPU) devices, digital signal processors (DSPs), and modems, among others.

Power management techniques save power and manage thermal limits in mobile devices. In operation, the compute devices within a mobile device generate heat or thermal energy, which at excessive levels may be detrimental to the internal circuitry of the mobile device. The amount of generated thermal energy may vary depending upon the operating conditions. For example, processors may generate substantial thermal energy when operating at high workload levels.

Techniques are known to dynamically adjust a power supply voltage to attempt to maximize battery time, control thermal energy production, or provide other power management benefits. It would be desirable to have a system for managing the power consumption of compute devices of a mobile device to limit maximum average power of the compute devices based on various scenarios.

SUMMARY

In aspects of the present disclosure, a method for power control includes receiving first power consumption data of a first compute device based on measurements of the first compute device. The method also includes receiving second power consumption data of a second compute device based on measurements of the second compute device. The method further includes receiving system power data to obtain a system power limitation. The method also includes calculating a power budget threshold for the first compute device and the second compute device based on the first power consumption data, the second power consumption data, and the system power limitation. The method includes controlling performance of the first compute device to operate within the power budget threshold, and controlling performance of the second compute device to operate within the power budget threshold.

Other aspects of the present disclosure are directed to an apparatus. The apparatus has at least one memory and one or more processors coupled to the at least one memory. The processor(s) is configured to receive first power consumption data of a first compute device based on measurements of the first compute device and second power consumption data of a second compute device based on measurements of the second compute device. The processor(s) is further configured to receive system power data to obtain a system power limitation. The processor(s) is also configured to calculate a power budget threshold for the first compute device and the second compute device based on the first power consumption data, the second power consumption data, and the system power limitation. The processor(s) is configured to control performance of the first compute device to operate within the power budget threshold and to control performance of the second compute device to operate within the power budget threshold.

Other aspects of the present disclosure are directed to an apparatus. The apparatus includes means for receiving first power consumption data of a first compute device based on measurements of the first compute device, and means for receiving second power consumption data of a second compute device based on measurements of the second compute device. The apparatus further includes means for receiving system power data to obtain a system power limitation. The apparatus includes means for calculating a power budget threshold for the first compute device and the second compute device based on the first power consumption data, the second power consumption data, and the system power limitation. The apparatus also includes means for controlling performance of the first compute device to operate within the power budget threshold. The apparatus includes means for controlling performance of the second compute device to operate within the power budget threshold.

In other aspects of the present disclosure, a non-transitory computer-readable medium includes program code to receive first power consumption data of a first compute device based on measurements of the first compute device and program code to receive second power consumption data of a second compute device based on measurements of the second compute device. The program code further includes program code to receive system power data to obtain a system power limitation. The program code also includes program code to calculate a power budget threshold for the first compute device and the second compute device based on the first power consumption data, the second power consumption data, and the system power limitation. The program code also includes program code to control performance of the first compute device to operate within the power budget threshold. The program code includes program code to control performance of the second compute device to operate within the power budget threshold.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

For a more complete understanding of the present disclosure, reference is now made to the following description taken in conjunction with the accompanying drawings.

FIG. 3 is a flow diagram illustrating an example process performed, for example, by a power limits driver, in accordance with various aspects of the present disclosure.

FIG. 4 is a flow diagram illustrating an example process performed, for example, by a mobile device, in accordance with various aspects of the present disclosure.

DETAILED DESCRIPTION

Figure 1:
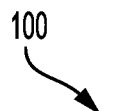
FIG. 1 is a block diagram illustrating an example implementation of a host system-on-a-chip (SoC), including a power limits driver, in accordance with certain aspects of the present disclosure.

The detailed description set forth below, in connection with the appended drawings, is intended as a description of various configurations and is not intended to represent the only configurations in which the concepts described may be practiced. The detailed description includes specific details for the purpose of providing a thorough understanding of the various concepts. It will be apparent, however, to those skilled in the art that these concepts may be practiced without these specific details. In some instances, well-known structures and components are shown in block diagram form in order to avoid obscuring such concepts.

As described, the use of the term "and/or" is intended to represent an "inclusive OR," and the use of the term "or" is intended to represent an "exclusive OR." As described, the term "exemplary" used throughout this description means "serving as an example, instance, or illustration," and should not necessarily be construed as preferred or advantageous over other exemplary configurations. As described, the term "coupled" used throughout this description means "connected, whether directly or indirectly through intervening connections (e.g., a switch), electrical, mechanical, or otherwise," and is not necessarily limited to physical connections. Additionally, the connections can be such that the objects are permanently connected or releasably connected. The connections can be through switches. As described, the term "proximate" used throughout this description means "adjacent, very near, next to, or close to." As described, the term "on" used throughout this description means "directly on" in some configurations, and "indirectly on" in other configurations.

It would be desirable to limit system or system-on-a-chip (SoC) power based on various use cases. For example, an SoC may have a peak power consumption and/or a sustained power consumption above specifications for how much power a battery system may deliver. The power may be limited for certain use cases, such as managing battery discharge. Other use cases include limiting power to charger output capacity for a damaged battery, balancing power between an SoC and a discrete graphics processing unit (dGPU), limiting power to manage heat pipe capacity, limiting power to extend battery life, and limiting power to manage fan acoustics.

Aspects of the present disclosure control and manage the maximum average power consumption of a compute device by implementing a feedback loop that uses system level power measurements to periodically select a highest performance state while keeping the system within a fixed power constraint/threshold. Actual power consumption depends on the workload of the compute device. In some aspects of the present disclosure, power limits are based on digital power meters. In these aspects, digital power meters in subsystems (e.g., compute devices) measure each power domain. Digital power meters also measure power rail levels. The power rail levels provide rail power levels to enable a total SoC power measurement. Digital power meters may estimate dynamic and leakage power consumed by subsystems, such as the central processing unit (CPU) (also referred to as the SoC) and GPU. A power peak throttler may be provided in a closed loop with the digital power meters. The peak power throttler limits peak power draw to a programmable value. Hardware trackers gather data (e.g., from the CPU) from sensors and/or estimators and apply mitigation via actuators to perform power or thermal management.

Particular aspects of the subject matter described in this disclosure can be implemented to realize one or more of the following potential advantages. In some examples, the described techniques, such as calculating a power budget threshold and controlling performance of devices, enable limiting of system and SoC power to manage various use cases, such as those related to battery power and thermal limits. Other advantages include improved visibility for subsystem level power and energy.

FIG. 1 illustrates an example implementation of a host system-on-a-chip (SoC) 100, which includes a power limits driver, in accordance with aspects of the present disclosure. The host SoC 100 includes processing blocks tailored to specific functions, such as a connectivity block 110. The connectivity block 110 may include fifth generation (5G) connectivity, fourth generation long term evolution (4G LTE) connectivity, Wi-Fi connectivity, universal serial bus (USB) connectivity, Bluetooth® connectivity, Secure Digital (SD) connectivity, and the like.

In this configuration, the host SoC 100 includes various processing units that support multi-threaded operation. For the configuration shown in FIG. 1, the host SoC 100 includes a multi-core central processing unit (CPU) 102, a graphics processor unit (GPU) 104, a digital signal processor (DSP) 106, and a neural processor unit (NPU) 108. The host SoC 100 may also include a sensor processor 114, image signal processors (ISPs) 116, a navigation module 120, which may include a global positioning system (GPS), and a memory 118. The multi-core CPU 102, the GPU 104, the DSP 106, the NPU 108, and the multi-media engine 112 support various functions such as video, audio, graphics, gaming, artificial networks, and the like. Each processor core of the multi-core CPU 102 may be a reduced instruction set computing (RISC) machine, an advanced RISC machine (ARM), a microprocessor, or some other type of processor. The NPU 108 may be based on an ARM instruction set.

As noted above, it would be desirable to limit system or system-on-a-chip (SoC) power based on various use cases. For example, an SoC may have a peak power consumption and/or a sustained power consumption above specifications for how much power a battery system may deliver. This power may be limited for certain use cases, such as managing battery discharge. Other use cases include limiting power to charger output capacity for a damaged battery, balancing power between an SoC and a discrete graphics processing unit (dGPU), limiting power to manage heat pipe capacity, limiting power to extend battery life, and limiting power to manage fan acoustics.

Aspects of the present disclosure control and manage the maximum average power consumption of a compute device by implementing a feedback loop that uses system level power measurements to periodically select a highest performance state while keeping the system within a fixed power constraint/threshold. In some aspects, multiple control loops run for different average power durations. For example, a power limits driver (PLD) may monitor a limit(s) for continuous average power (CAP) and a limit(s) for burst average power (BAP) for the system. The BAP limits are associated with a burst duration, for example, how long to average and control power. In addition, there may be CAP and BAP limits for the package/SoC.

Actual power consumption depends on the workload of the compute device. Actual power consumption may momentarily exceed the threshold until performance adjustments are completed. For example, consider a system that has minimum and maximum potential power consumption values of 500 W and 700 W, respectively. A power budget threshold may be specified to reduce consumption to 525 W. When this power budget is configured, the performance of the system is dynamically adjusted to maintain power consumption of 525 W or less. In some aspects of the present disclosure, power limits are based on digital power meters. In these aspects, digital power meters in all major subsystems (e.g., compute devices) measure each power domain. Digital power meters also measure power rail levels. The power rail levels provide rail power levels to enable a total SoC power measurement.

Digital power meters estimate dynamic and leakage power consumed by subsystems, such as the CPU (also referred to more generally as the SoC) and GPU. A power peak throttler may be provided in a closed loop with the digital power meters. The peak power throttler limits peak power draw to a programmable value. Hardware trackers gather data from sensors and/or estimators and apply mitigation via actuators. In some implementations, a maximum average power (MAP) limits hardware tracker gathers data from the CPU. The MAP tracker(s) may be configured to monitor power over a moving average window. The average may be an exponentially weighted moving average or a simple average. The duration is configurable. The actuators may be implemented as finite state machines that implement hardware control loops in the overall system.

On the CPU, a CPU subsystem power and clock management controller (e.g., power management controller (PMC) firmware) may perform power or thermal management for a CPU cluster, particularly the performance-control software loop that manages the power performance state (P-state) of a cluster. The firmware reads event monitoring (EMON) registers periodically and makes CPU power data available to a power limits driver (PLD). In some aspects, the power limits driver may be implemented on an audio digital signal processor (ADSP) via shared memory. The EMON registers may be preferable to performance monitor unit (PMU) events, which include non-core information, such as cache and memory of the CPU, GPU, (e.g., a last level cache (LLC)), bus interface unit (BIU) information, etc. The EMON registers also track power on a per core or cluster granularity, dynamic, leakage, and total power, etc. A similar approach may be applied to subsystems other than the CPU subsystem.

Advantages of the proposed solution include the ability to meet accuracy specifications because the proposed solution improves visibility for subsystem level power and energy. Other advantages include a low area penalty power efficiency, more predictable characterization, more robust digital verification, and less complex silicon implementation. By using hardware trackers, firmware can perform power or thermal management on a per cluster or subsystem basis, particularly the performance-control software loop that manages the P-state of a cluster. Dynamic power may be computed as a weighted summation of micro-architectural events across a limited sample set. The weights may be workload dependent. The digital power meter may scale to high tier, mid-tier, and value tier chipsets.

Figure 2:
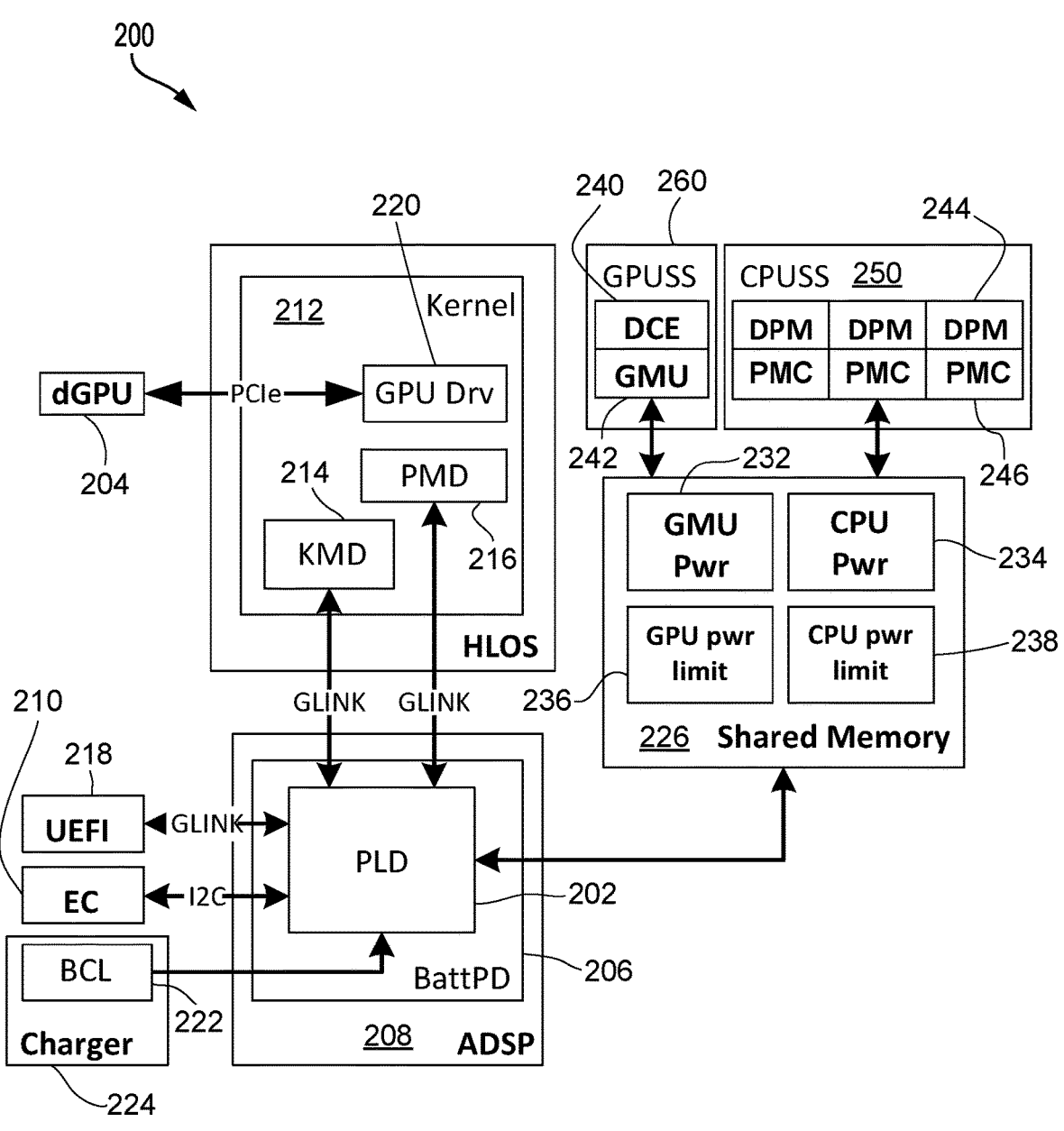
FIG. 2 is a block diagram illustrating a power limits architecture, in accordance with aspects of the present disclosure.

FIG. 2 is a block diagram illustrating a power limits architecture 200, in accordance with aspects of the present disclosure. In the power limits architecture 200, a power limits driver (PLD) 202 manages system and SoC power limits by setting power caps on a central processing unit (CPU) (also referred to as a system-on-a-chip (SoC), chip or package) and a graphics processing unit (GPU). Other compute devices may also be controlled (e.g., the NPU 108, DSP 106, or ISP 116 of FIG. 1, or any discrete processing unit), but to ease explanation, only these two compute devices are described. The power limit may be defined for the entire SoC.

The assigned power limit may be controlled by adjusting power consumption of one or more components. In some aspects, the SoC performance and power consumption is adjusted. For example, the PLD 202 may balance power between the SoC and a discrete GPU (dGPU) 204 by setting power caps on a central processing unit (CPU) of the SoC and the dGPU 204. When the dGPU 204 is not utilized, the PLD 202 may steer power between the CPU and a GPU inside the SoC by setting power caps on the CPU and the GPU. In the example of FIG. 2, the GPU may be a dGPU 204 or a GPU (not shown) within a GPU subsystem (GPUSS) 260.

The PLD 202 may reside within a battery protection domain (BattPD) 206, although such a location is non-limiting. The battery protection domain 206 may include battery charging software and USB software for monitoring USB devices. In the example of FIG. 2, the battery protection domain 206 resides within an audio digital signal processor (ADSP) 208.

The power limitations for the system may originate from an external controller (EC) 210, a service layer 212, a power management controller (PMC) 216 (e.g., a power engine plug-in (PEP)), a unified extensible firmware interface (UEFI) 218, and/or the PLD 202. The power limitations may dictate how much power can be allocated to an SoC and/or GPU, in some aspects. The EC 210 may monitor and manage platform power, for example, based on whether a cooling fan is running. The EC 210 may communicate with the PLD 202 via an inter-integrated circuit (I2C) link. The service layer 212 may be a high level operating system (HLOS) kernel, for example, a MICROSOFT WINDOWS operating system kernel. The kernel 212 may include a kernel mode driver (KMD) 214, which is an operating system software driver that configures and sends commands to the GPUSS 260. The KMD 214 may communicate with the PLD 202 via a GLINK interface. The KMD 214 offloads processing to the dGPU 204, which has its own driver (not shown). The PMC 216 may be a power limits driver that operates as a gateway for the kernel 212 to communicate with the SoC. The PMC 216 runs on a CPU subsystem (CPUSS) 250 and assists with setting the operating state (e.g., the clock and voltage) of the CPUSS 250. The UEFI 218 and the PMC 216 communicate with the PLD 202 via a GLINK interface. The UEFI 218 may initialize the PLD 202. A graphics card driver, such as a discrete GPU driver (GPU DRV) 220 may communicate with an external graphics card (e.g., dGPU 204) via a peripheral component interconnect express (PCIe) interface. The discrete GPU driver 220 receives the power limits from the dGPU 204 when the dGPU 204 is running and sends this information to the PLD 202 in order to balance power between the CPUSS 250 and dGPU 204.

A battery charge limiter (BCL) 222 of a charger 224 communicates with the PLD 202. The BCL 222 monitors the battery and manages the battery during voltage droop and overcurrent consumption. While monitoring the battery, the BCL 222 may provide an indication of power limits that may trigger further constraints on power consumption of the system, e.g., the SoC and GPU. The PLD 202 may measure system power by reading current and voltage data from the charger. In some aspects (not shown), the power monitor is an external third party power monitor.

A shared memory 226 may communicate with the GPU subsystem (GPUSS) 260 and a CPU subsystem (CPUSS) 250. The shared memory 226 may store graphics management unit power data (GMU Pwr) 232 and central processing unit power unit data (CPU Pwr) 234. The graphics management unit power data (GMU Pwr) 232 includes a GPU power limit 236. The central processing unit power unit data (CPU Pwr 234 includes a CPU power limit 238.

The GPU subsystem (GPUSS) 260 includes a GPU (not shown), a digital current estimator (DCE) 240 and a graphics management unit (GMU) 242. The graphics management unit (GMU) 242 may operate as a power and clock manager for the graphics core, and may control the GPU based on the graphics management unit power data (GMU Pwr) 232 and the GPU power limit 236. The digital current estimator (DCE) 240 may operate as a power monitor, measuring power consumed by the GPU.

The CPU subsystem (CPUSS) 250 includes a CPU (not shown), digital power monitor (DPM) 244 and a power management debug processor (PMC) 246 for each cluster (three clusters shown in the example of FIG. 2). The power management debug processor (PMC) 246 may operate as a power and clock manager for the SoC cores, and may control the SoC based on the CPU power data (CPU Pwr) 234 and the CPU power limit 238. Each digital power monitor (DPM) 244 may operate as a power monitor, measuring power consumed by the SoC cluster.

Based on the power limit, system power, CPU power, and GPU power, the PLD 202 calculates a budget for the CPU and GPU. The CPU and GPU limit the amount of consumed power to the budget by reducing performance. The performance may be reduced with firmware or hardware mechanisms, for example, maximum average power limiters. In some aspects, power is balanced between the SoC and the GPU.

A battery may have several requirements related to average discharge current or discharge power. For example, discharge current peaks managed by the BCL 222 in the charger 224 may be on the order of 10 ms. The discharge current or discharge power may be managed by the PLD 202 every second. Discharge power may be managed by the PLD 202 continuously. The BCL 222 also manages very short duration battery voltage droops, on the order of every 10 μs.

In some implementations, the BCL 222 measures current and/or power at the battery every 100 ms. The BCL 222 may also transmit the measurements to the kernel 212 at the same periodicity. Based on the measurements, the BCL 222 may indicate that current power limits are to be updated to further constrain power consumption.

A process for calculating the power limits budget is now described. In some aspects of the present disclosure, power may be managed based on CPU power consumption. A budget process may track multiple power limits and determine a worst case limiter. Power limits are set to manage multiple potential limiters. For example, a battery continuous discharge may be monitored. In some implementations, a 54 W continuous discharge rating may be a limiter. A battery burst discharge may also be a limiter. In some implementations, the battery burst discharge limit is 7.5 A for 10 seconds. Other potential limiters may include a heat pipe capacity and a platform thermal design power (TDP). The TDP may correspond to SoC limits based on system settings, such as fan acoustics, whether the device is docked, etc.

According to aspects of the present disclosure, the power limit is set to one of four limits. A first limit is based on the total allowable system power for continuous operation. A second limit is based on the total allowable system power for a specified duration. A third limit is based on the total allowable SoC system power for continuous operation. A fourth limit is based on the total allowable SoC system power for a specified duration.

As noted above, in some aspects, the GPU and CPU power may both be controlled. In other aspects, however, only the SoC power is controlled. In these aspects where only the CPU is controlled, a minimum CPU power limit to enable a usable device is specified. If the CPU minimum is reached, the GPU is throttled.

FIG. 3 is a flow diagram illustrating an example process 300 performed, for example, by a power limits driver (PLD), in accordance with various aspects of the present disclosure. The process 300 consists of two threads in this example. The first thread will now be described. The first thread (Thread #1) is the main PLD loop. After initializing the periodic budget thread at block s302, at block s304, the process 300 waits for a signal to start the process or alternatively waits for a timer to start the process. The initialization may by triggered by the unified extensible firmware interface (UEFI), in some implementations. At block s306, it is determined whether a timer expired or a communication (comms) arrived, indicating updated power limits. The timer triggers periodic updates for power limits. When the timer expires, the first thread runs. The communication may be the asynchronous wake signal arriving from a second thread (Thread #2) in response to another process sending a new limit.

If the communication indicating updated power limits has arrived, the power limits are updated at block s308 into the shared memory 226 and the process 300 continues at block s314. If the timer expired, the process 300 reads the power data for the CPU and GPU at block s310 and determines which of the configured power limits has the tightest constraint based on the system power data at block s312. At block 314, a proportional integral derivative (PID) control process executes. At block s316, the process 300 selects a minimum power limit. More specifically, the PLD monitors more than one limit, such as limits for the continuous average power (CAP) and burst average power (BAP) for the system. In addition, there may be CAP and BAP limits for the package/SoC. The BAP limits are also associated with a burst duration, for example, how long to average and control power. In the example of block s314, four instances of control loops monitor average power consumption versus the limit. In block s316, the limit that has the least headroom is selected to apply power budgets to the CPU and GPU. Note the average calculation may be an exponentially weighted moving average or a simple moving average. In some implementations, the burst window may be five seconds and continuous may be defined as a duration long enough that the moving average represents a value close to the continuous specified limit for the limit in question.

Based on the constraints and the power limits in the shared memory 226, the budget process generates new GPU and CPU power limits at block s318. At block s320, new power limits are sent to the CPU and GPU. After the new power limits are sent at block s320, the process 300 goes to sleep and waits for the comms signal or the timer to start the process 300 at block s304.

The second thread (Thread #2) handles communications. All interrupts and callbacks are sent to the second thread. The second thread wakes the first thread, as needed. At block s340, communications are initialized. At block s342, communications interrupts are processed. For example, a laptop may be plugged into an electrical outlet and operating at a sustained limit that could be delivered from the battery plus the charger. If the charger is unplugged, the PLD changes the limit to the capability of only the battery. Another entity informs the PLD that the charger is unplugged by sending communication to the second thread, the communications being received at block s342.

According to aspects of the present disclosure, a mobile device includes a power limits driver. The power limits driver may include means for calculating a power budget threshold for a first compute device and a second compute device based on first power consumption data, second power consumption data, and a system power limitation. In one configuration, the calculating means may be the PLD 202, as shown in FIG. 2. In other aspects, the aforementioned means may be any structure or any material configured to perform the functions recited by the aforementioned means.

As indicated above, FIGS. 2-3 are provided as examples. Other examples may differ from what is described with respect to FIGS. 2-3.

FIG. 4 is a flow diagram illustrating an example process 400 performed, for example, by a mobile device, in accordance with various aspects of the present disclosure. The example process 400 is an example of power control for computing devices based on system level power measurements.

As shown in FIG. 4, in some aspects, the process 400 may include receiving first power consumption data of a first compute device based on measurements of the first compute device (block 402). For example, the first compute device may be a system-on-a-chip (SoC).

In some aspects, the process 400 may include receiving second power consumption data of a second compute device based on measurements of the second compute device (block 404). For example, the second compute device may be a GPU.

In some aspects, the process 400 may include receiving system power data to obtain a system power limitation (Block 406). For example, the system power data may include battery data and/or thermal data.

In some aspects, the process 400 may include calculating a power budget threshold for the first compute device and the second compute device based on the first power consumption data, the second power consumption data, and the system power limitation (block 408). For example, the system power limitation may include: a total allowable system power for continuous system operation, a total allowable power for a duration of system operation, a total allowable system power for continuous SoC operation, and a total allowable power for a duration of SoC operation.

In some aspects, the process 400 may include controlling performance of the first compute device to operate within the power budget threshold (block 410). For example, the clock speed of the first compute device may be reduced.

In some aspects, the process 400 may include controlling performance of the second compute device to operate within the power budget threshold (block 412). For example, the clock speed of the second compute device may be reduced.

Figure 5:
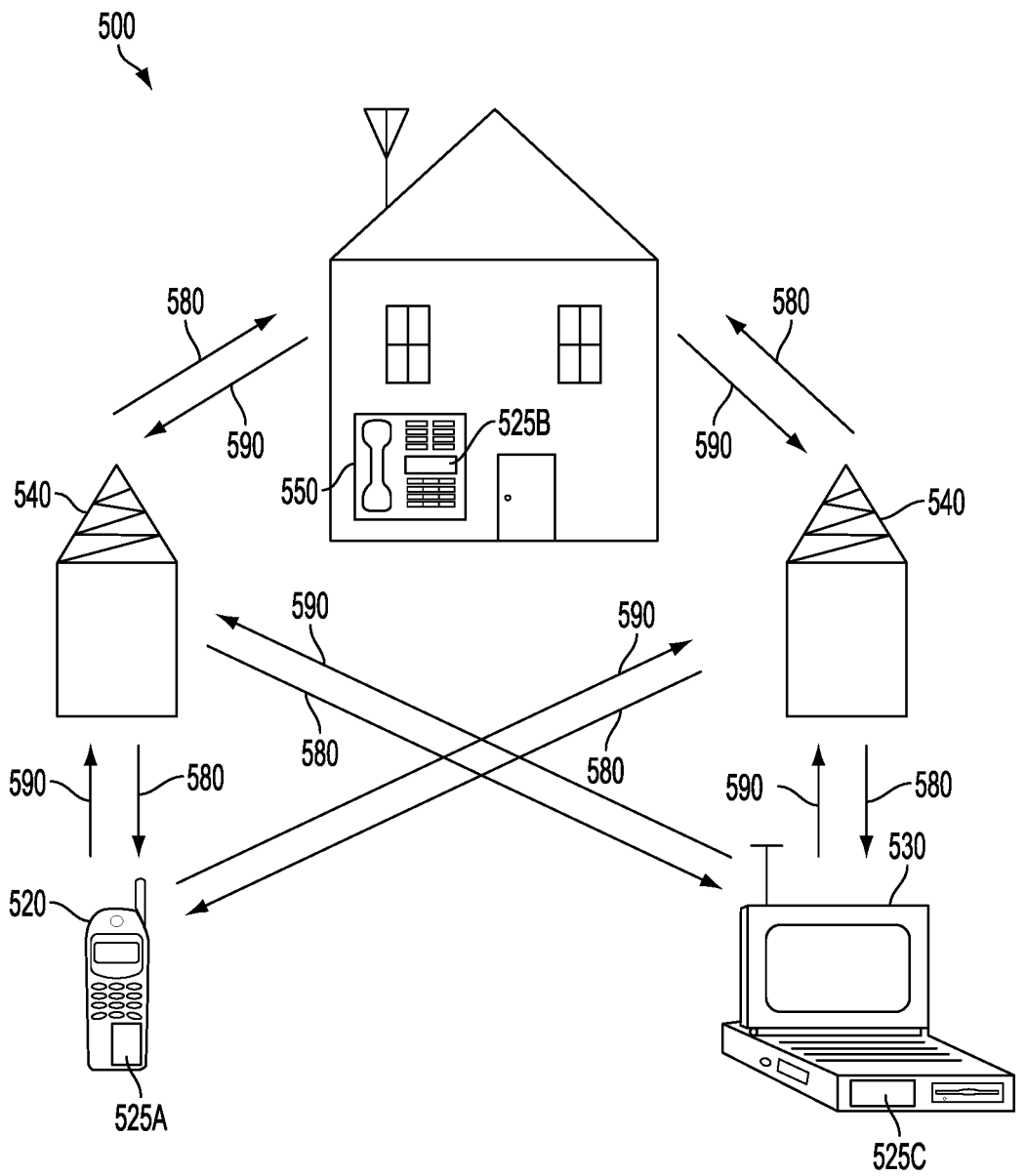
FIG. 5 is a block diagram showing an exemplary wireless communications system in which a configuration of the present disclosure may be advantageously employed.

FIG. 5 is a block diagram showing an exemplary wireless communications system 500, in which an aspect of the present disclosure may be advantageously employed. For purposes of illustration, FIG. 5 shows three remote units 520, 530, and 550, and two base stations 540. It will be recognized that wireless communications systems may have many more remote units and base stations. Remote units 520, 530, and 550 include integrated circuit (IC) devices 525A, 525B, and 525C that include the disclosed power limits driver (PLD). It will be recognized that other devices may also include the disclosed PLD, such as the base stations, switching devices, and network equipment. FIG. 5 shows forward link signals 580 from the base stations 540 to the remote units 520, 530, and 550, and reverse link signals 590 from the remote units 520, 530, and 550 to the base stations 540.

In FIG. 5, remote unit 520 is shown as a mobile telephone, remote unit 530 is shown as a portable computer, and remote unit 550 is shown as a fixed location remote unit in a wireless local loop system. For example, the remote units may be a mobile phone, a hand-held personal communication systems (PCS) unit, a portable data unit, such as a personal data assistant, a GPS enabled device, a navigation device, a set top box, a music player, a video player, an entertainment unit, a fixed location data unit, such as meter reading equipment, or other device that stores or retrieves data or computer instructions, or combinations thereof. Although FIG. 5 illustrates remote units according to the aspects of the present disclosure, the disclosure is not limited to these exemplary illustrated units. Aspects of the present disclosure may be suitably employed in many devices, which include the disclosed PLD.

Figure 6:
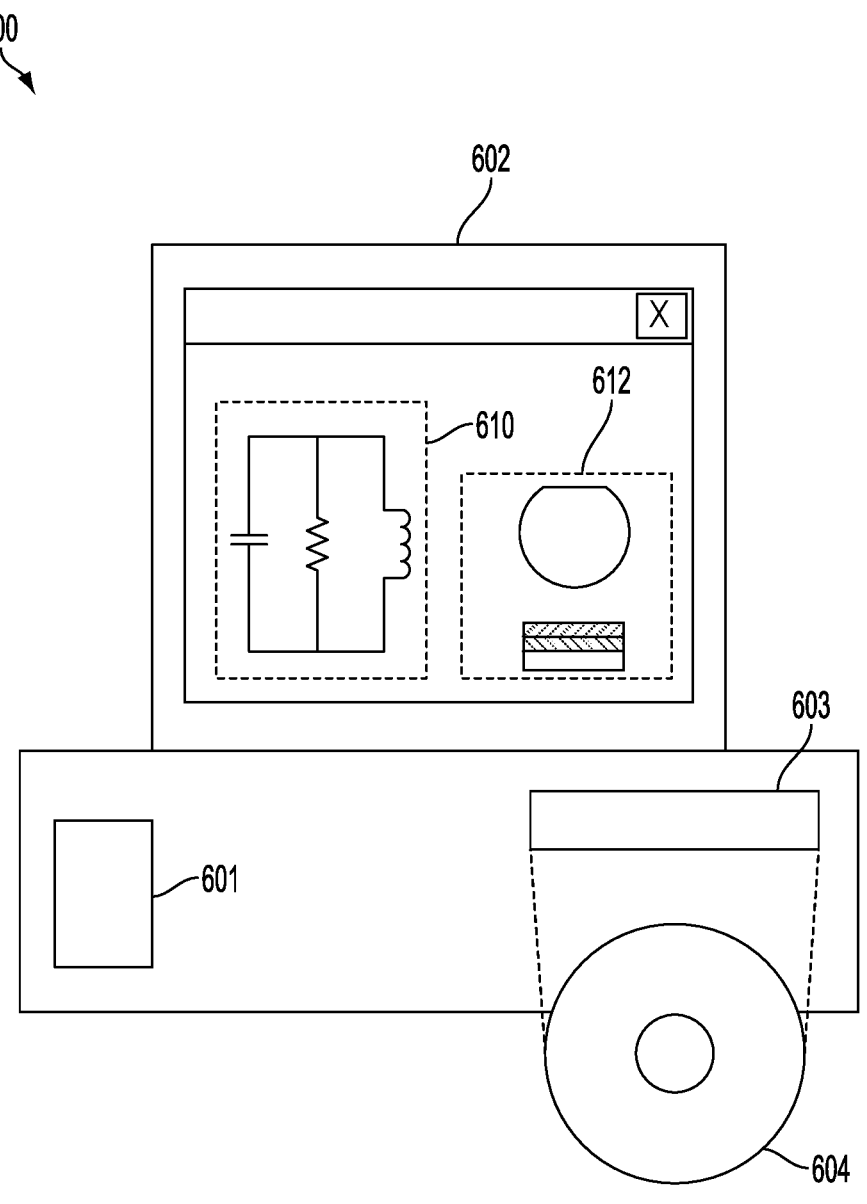
FIG. 6 is a block diagram illustrating a design workstation used for circuit, layout, and logic design of components, in accordance with various aspects of the present disclosure.

FIG. 6 is a block diagram illustrating a design workstation 600 used for circuit, layout, and logic design of a semiconductor component, such as the PLD disclosed above. The design workstation 600 includes a hard disk 601 containing operating system software, support files, and design software such as Cadence or OrCAD. The design workstation 600 also includes a display 602 to facilitate design of a circuit 610 or a semiconductor component 612, such as the PLD. A storage medium 604 is provided for tangibly storing the design of the circuit 610 or the semiconductor component 612 (e.g., the PLD). The design of the circuit 610 or the semiconductor component 612 may be stored on the storage medium 604 in a file format such as GDSII or GERBER. The storage medium 604 may be a CD-ROM, DVD, hard disk, flash memory, or other appropriate device. Further-more, the design workstation 600 includes a drive apparatus 603 for accepting input from or writing output to the storage medium 604.

Data recorded on the storage medium 604 may specify logic circuit configurations, pattern data for photolithography masks, or mask pattern data for serial write tools such as electron beam lithography. The data may further include logic verification data such as timing diagrams or net circuits associated with logic simulations. Providing data on the storage medium 604 facilitates the design of the circuit 610 or the semiconductor component 612 by decreasing the number of processes for designing semiconductor wafers.

EXAMPLE ASPECTS

Aspect 1: A method of power control, comprising: receiving first power consumption data of a first compute device based on measurements of the first compute device; receiving second power consumption data of a second compute device based on measurements of the second compute device; receiving system power data to obtain a system power limitation; calculating a power budget threshold for the first compute device and the second compute device based on the first power consumption data, the second power consumption data, and the system power limitation; controlling performance of the first compute device to operate within the power budget threshold; and controlling performance of the second compute device to operate within the power budget threshold.

Aspect 2: The method of Aspect 1, in which the system power data comprises at least one of: battery data and thermal data.

Aspect 3: The method of Aspect 1 or 2, in which the first compute device comprises a system-on-a-chip (SoC) and the second compute device comprises a graphics processing unit (GPU).

Aspect 4: The method of any of the preceding Aspects, in which the system power limitation comprises: a total allowable system power for continuous system operation, a total allowable power for a duration of system operation, a total allowable system power for continuous SoC operation, and a total allowable power for a duration of SoC operation.

Aspect 5: The method of any of the preceding Aspects, in which the measurements of the first compute device comprise digital power meter estimates of dynamic power and leakage power of the first compute device, the measurements of the second compute device comprise digital power meter estimates of dynamic power and leakage power of the second compute device, controlling performance of the first compute device comprises limiting maximum average power to the first compute device, and controlling performance of the second compute device comprises limiting maximum average power to the second compute device.

Aspect 6: An apparatus for power control, comprising: at least one memory; and at least one processor coupled to the at least one memory, the at least one processor configured: to receive first power consumption data of a first compute device based on measurements of the first compute device; to receive second power consumption data of a second compute device based on measurements of the second compute device; to receive system power data to obtain a system power limitation; to calculate a power budget threshold for the first compute device and the second compute device based on the first power consumption data, the second power consumption data, and the system power limitation; to control performance of the first compute device to operate within the power budget threshold; and to control performance of the second compute device to operate within the power budget threshold.

Aspect 7: The apparatus of Aspect 6, in which the system power data comprises at least one of: battery data and thermal data.

Aspect 8: The apparatus of Aspect 6 or 7, in which the first compute device comprises a system-on-a-chip (SoC) and the second compute device comprises a graphics processing unit (GPU).

Aspect 9: The apparatus of any of the Aspects 6-8, in which the system power limitation comprises: a total allowable system power for continuous system operation, a total allowable power for a duration of system operation, a total allowable system power for continuous SoC operation, and a total allowable power for a duration of SoC operation.

Aspect 10: The apparatus of any of the Aspects 6-9, in which the measurements of the first compute device comprise digital power meter estimates of dynamic power and leakage power of the first compute device, the measurements of the second compute device comprise digital power meter estimates of dynamic power and leakage power of the second compute device, controlling performance of the first compute device comprises limiting maximum average power to the first compute device, and controlling performance of the second compute device comprises limiting maximum average power to the second compute device.

Aspect 11: An apparatus for power control, comprising: means for receiving first power consumption data of a first compute device based on measurements of the first compute device; means for receiving second power consumption data of a second compute device based on measurements of the second compute device; means for receiving system power data to obtain a system power limitation; means for calculating a power budget threshold for the first compute device and the second compute device based on the first power consumption data, the second power consumption data, and the system power limitation; means for controlling performance of the first compute device to operate within the power budget threshold; and means for controlling performance of the second compute device to operate within the power budget threshold.

Aspect 12: The apparatus of Aspect 11, in which the system power data comprises at least one of: battery data and thermal data.

Aspect 13: The apparatus of Aspect 11 or 12, in which the first compute device comprises a system-on-a-chip (SoC) and the second compute device comprises a graphics processing unit (GPU).

Aspect 14: The apparatus of any of the Aspects 11-13, in which the system power limitation comprises: a total allowable system power for continuous system operation, a total allowable power for a duration of system operation, a total allowable system power for continuous SoC operation, and a total allowable power for a duration of SoC operation.

Aspect 15: The apparatus of any of the Aspects 11-14, in which the measurements of the first compute device comprise digital power meter estimates of dynamic power and leakage power of the first compute device, the measurements of the second compute device comprise digital power meter estimates of dynamic power and leakage power of the second compute device, controlling performance of the first compute device comprises limiting maximum average power to the first compute device, and controlling performance of the second compute device comprises limiting maximum average power to the second compute device.

Aspect 16: A non-transitory computer-readable medium having program code recorded thereon, the program code executed by a processor and comprising: program code to receive first power consumption data of a first compute device based on measurements of the first compute device; program code to receive second power consumption data of a second compute device based on measurements of the second compute device; program code to receive system power data to obtain a system power limitation; program code to calculate a power budget threshold for the first compute device and the second compute device based on the first power consumption data, the second power consumption data, and the system power limitation; program code to control performance of the first compute device to operate within the power budget threshold; and program code to control performance of the second compute device to operate within the power budget threshold.

Aspect 17: The non-transitory computer-readable medium of Aspect 16, in which system power data comprises at least one of: battery data and thermal data.

Aspect 18: The non-transitory computer-readable medium of Aspect 16 or 17, in which the first compute device comprises a system-on-a-chip (SoC) and the second compute device comprises a graphics processing unit (GPU).

Aspect 19: The non-transitory computer-readable medium of any of the Aspects 16-18, in which the system power limitation comprises: a total allowable system power for continuous system operation, a total allowable power for a duration of system operation, a total allowable system power for continuous SoC operation, and a total allowable power for a duration of SoC operation.

Aspect 20: The non-transitory computer-readable medium of any of the Aspects 16-19, in which the measurements of the first compute device comprise digital power meter estimates of dynamic power and leakage power of the first compute device, the measurements of the second compute device comprise digital power meter estimates of dynamic power and leakage power of the second compute device, controlling performance of the first compute device comprises limiting maximum average power to the first compute device, and controlling performance of the second compute device comprises limiting maximum average power to the second compute device.

For a firmware and/or software implementation, the methodologies may be implemented with modules (e.g., procedures, functions, and so on) that perform the functions described. A machine-readable medium tangibly embodying instructions may be used in implementing the methodologies described. For example, software codes may be stored in a memory and executed by a processor unit. Memory may be implemented within the processor unit or external to the processor unit. As used, the term "memory" refers to types of long term, short term, volatile, nonvolatile, or other memory and is not limited to a particular type of memory or number of memories, or type of media upon which memory is stored.

If implemented in firmware and/or software, the functions may be stored as one or more instructions or code on a computer-readable medium. Examples include computer-readable media encoded with a data structure and computer-readable media encoded with a computer program. Computer-readable media includes physical computer storage media. A storage medium may be an available medium that can be accessed by a computer. By way of example, and not limitation, such computer-readable media can include random access memory (RAM), read-only memory (ROM), electrically erasable read-only memory (EEPROM), compact disc read-only memory (CD-ROM) or other optical disk storage, magnetic disk storage or other magnetic storage devices, or other medium that can be used to store desired program code in the form of instructions or data structures and that can be accessed by a computer. Disk and disc, as used, include compact disc (CD), laser disc, optical disc, digital versatile disc (DVD), floppy disk, and Blu-ray® disc, where disks usually reproduce data magnetically, while discs reproduce data optically with lasers. Combinations of the above should also be included within the scope of computer-readable media.

In addition to storage on computer-readable medium, instructions and/or data may be provided as signals on transmission media included in a communications apparatus. For example, a communications apparatus may include a transceiver having signals indicative of instructions and data. The instructions and data are configured to cause one or more processors to implement the functions outlined in the claims.

Although the present disclosure and its advantages have been described in detail, it should be understood that various changes, substitutions, and alterations can be made without departing from the technology of the disclosure as defined by the appended claims. For example, relational terms, such as "above" and "below" are used with respect to a substrate or electronic device. Of course, if the substrate or electronic device is inverted, above becomes below, and vice versa. Additionally, if oriented sideways, above and below may refer to sides of a substrate or electronic device. Moreover, the scope of the present disclosure is not intended to be limited to the particular configurations of the process, machine, manufacture, composition of matter, means, methods, and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding configurations described may be utilized according to the present disclosure. Accordingly, the appended claims are intended to include within their scope such processes, machines, manufacture, compositions of matter, means, methods, or steps.

Those of skill would further appreciate that the various illustrative logical blocks, modules, circuits, and algorithm steps described in connection with the present disclosure may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure may be implemented or performed with a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in RAM, flash memory, ROM, erasable programmable read-only memory (EPROM), EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the present disclosure is provided to enable any person skilled in the art to make or use the present disclosure. Various modifications to the disclosure will be readily apparent to those skilled in the art, and the generic principles defined may be applied to other variations without departing from the spirit or scope of the disclosure. Thus, the present disclosure is not intended to be limited to the examples and designs described, but is to be accorded the widest scope consistent with the principles and novel features disclosed.

What is claimed is:

1. A method of power control, comprising:

receiving first power consumption data of a first compute device based on measurements of the first compute device;

receiving second power consumption data of a second compute device based on measurements of the second compute device;

receiving system power data for a first system power limitation for total allowable system power for continuous operation, a second system power limitation for total allowable system power for a first duration, a third system power limitation for total allowable system on a chip (SoC) power for continuous operation, and a fourth limit for total allowable SoC system power for a second duration;

calculating a power budget threshold for the first compute device and the second compute device based on the first power consumption data, the second power consumption data, and a worst case limiter for the system power data;

controlling performance of the first compute device to operate within the power budget threshold; and controlling performance of the second compute device to operate within the power budget threshold.

2. The method of claim 1, in which the system power data comprises at least one of: battery data and thermal data.

3. The method of claim 1, in which the first compute device comprises a system-on-a-chip (SoC) and the second compute device comprises a graphics processing unit (GPU).

4. The method of claim 3, in which the system power data comprises: a total allowable system power for continuous system operation, a total allowable power for a duration of system operation, a total allowable system power for continuous SoC operation, and a total allowable power for a duration of SoC operation.

5. The method of claim 1, in which the measurements of the first compute device comprise digital power meter estimates of dynamic power and leakage power of the first compute device, the measurements of the second compute device comprise digital power meter estimates of dynamic power and leakage power of the second compute device, controlling performance of the first compute device comprises limiting maximum average power to the first compute device, and controlling performance of the second compute device comprises limiting maximum average power to the second compute device.

6. An apparatus for power control, comprising:

at least one memory; and at least one processor coupled to the at least one memory, the at least one processor configured:

to receive first power consumption data of a first compute device based on measurements of the first compute device;

to receive second power consumption data of a second compute device based on measurements of the second compute device;

to receive system power data for a first system power limitation for total allowable system power for continuous operation, a second system power limitation for total allowable system power for a first duration, a third system power limitation for total allowable system on a chip (SoC) power for continuous operation, and a fourth limit for total allowable SoC system power for a second duration;

to calculate a power budget threshold for the first compute device and the second compute device based on the first power consumption data, the second power consumption data, and a worst case limiter for the system power data;

to control performance of the first compute device to operate within the power budget threshold; and to control performance of the second compute device to operate within the power budget threshold.

7. The apparatus of claim 6, in which the system power data comprises at least one of: battery data and thermal data.

8. The apparatus of claim 6, in which the first compute device comprises a system-on-a-chip (SoC) and the second compute device comprises a graphics processing unit (GPU).

9. The apparatus of claim 8, in which the system power data comprises: a total allowable system power for continuous system operation, a total allowable power for a duration of system operation, a total allowable system power for continuous SoC operation, and a total allowable power for a duration of SoC operation.

10. The apparatus of claim 6, in which the measurements of the first compute device comprise digital power meter estimates of dynamic power and leakage power of the first compute device, the measurements of the second compute device comprise digital power meter estimates of dynamic power and leakage power of the second compute device, controlling performance of the first compute device comprises limiting maximum average power to the first compute device, and controlling performance of the second compute device comprises limiting maximum average power to the second compute device.

11. An apparatus for power control, comprising:

means for receiving first power consumption data of a first compute device based on measurements of the first compute device;

means for receiving second power consumption data of a second compute device based on measurements of the second compute device;

means for receiving system power data for a first system power limitation for total allowable system power for continuous operation, a second system power limitation for total allowable system power for a first duration, a third system power limitation for total allowable system on a chip (SoC) power for continuous operation, and a fourth limit for total allowable SoC system power for a second duration;

means for calculating a power budget threshold for the first compute device and the second compute device based on the first power consumption data, the second power consumption data, and a worst case limiter for the system power data;

means for controlling performance of the first compute device to operate within the power budget threshold; and means for controlling performance of the second compute device to operate within the power budget threshold.

12. The apparatus of claim 11, in which the system power data comprises at least one of: battery data and thermal data.

13. The apparatus of claim 11, in which the first compute device comprises a system-on-a-chip (SoC) and the second compute device comprises a graphics processing unit (GPU).

14. The apparatus of claim 13, in which the system power data comprises: a total allowable system power for continuous system operation, a total allowable power for a duration of system operation, a total allowable system power for continuous SoC operation, and a total allowable power for a duration of SoC operation.

15. The apparatus of claim 11, in which the measurements of the first compute device comprise digital power meter estimates of dynamic power and leakage power of the first compute device, the measurements of the second compute device comprise digital power meter estimates of dynamic power and leakage power of the second compute device, controlling performance of the first compute device comprises limiting maximum average power to the first compute device, and controlling performance of the second compute device comprises limiting maximum average power to the second compute device.

16. A non-transitory computer-readable medium having program code recorded thereon, the program code executed by a processor and comprising:

program code to receive first power consumption data of a first compute device based on measurements of the first compute device;

program code to receive second power consumption data of a second compute device based on measurements of the second compute device;

program code to receive system power data for a first system power limitation for total allowable system power for continuous operation, a second system power limitation for total allowable system power for a first duration, a third system power limitation for total allowable system on a chip (SoC) power for continuous operation, and a fourth limit for total allowable SoC system power for a second duration;

program code to calculate a power budget threshold for the first compute device and the second compute device based on the first power consumption data, the second power consumption data, and a worst case limiter for the system power data;

program code to control performance of the first compute device to operate within the power budget threshold; and program code to control performance of the second compute device to operate within the power budget threshold.

17. The non-transitory computer-readable medium of claim 16, in which system power data comprises at least one of: battery data and thermal data.

18. The non-transitory computer-readable medium of claim 16, in which the first compute device comprises a system-on-a-chip (SoC) and the second compute device comprises a graphics processing unit (GPU).

19. The non-transitory computer-readable medium of claim 18, in which the system power data comprises: a total allowable system power for continuous system operation, a total allowable power for a duration of system operation, a total allowable system power for continuous SoC operation, and a total allowable power for a duration of SoC operation.

20. The non-transitory computer-readable medium of claim 16, in which the measurements of the first compute device comprise digital power meter estimates of dynamic power and leakage power of the first compute device, the measurements of the second compute device comprise digital power meter estimates of dynamic power and leakage power of the second compute device, controlling performance of the first compute device comprises limiting maximum average power to the first compute device, and controlling performance of the second compute device comprises limiting maximum average power to the second compute device.

* * * * *